(12) United States Patent
Johansson et al.

(10) Patent No.: US 7,930,010 B2
(45) Date of Patent: Apr. 19, 2011

(54) AUTOMATIC ANTENNA IDENTIFICATION AND CONFIGURATION, AND DEVICE INCLUDING THE SAME

(75) Inventors: David Johansson, Malmö (SE); Anders Hansson, Klågerup (SE); Anders Lundquist, Malmö (SE); Markus Agevik, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 777 days.

(21) Appl. No.: 11/923,847

(22) Filed: Oct. 25, 2007

(65) Prior Publication Data
US 2009/0109117 A1    Apr. 30, 2009

(51) Int. Cl.
*H01Q 1/24* (2006.01)
(52) U.S. Cl. .................................... 455/575.7
(58) Field of Classification Search ............... 455/575.7; 343/702
See application file for complete search history.

(56) References Cited

U.S. PATENT DOCUMENTS

| | | | | |
|---|---|---|---|---|
| 5,701,596 | A * | 12/1997 | Meredith et al. | 455/103 |
| 7,035,609 | B1 * | 4/2006 | Fry | 455/200.1 |
| 2004/0087295 | A1 | 5/2004 | Abbasi et al. | |
| 2004/0127247 | A1 | 7/2004 | Reece et al. | |
| 2004/0242289 | A1 * | 12/2004 | Jellicoe et al. | 455/575.1 |
| 2005/0049020 | A1 * | 3/2005 | Higgins et al. | 455/575.7 |
| 2005/0054304 | A1 * | 3/2005 | Gierl et al. | 455/101 |
| 2005/0153665 | A1 * | 7/2005 | Nicholson | 455/83 |
| 2006/0050686 | A1 * | 3/2006 | Velez-Rivera et al. | 370/352 |
| 2006/0080712 | A1 * | 4/2006 | Onomatsu | 725/72 |
| 2006/0197538 | A1 * | 9/2006 | Leinonen et al. | 324/533 |
| 2007/0252699 | A1 * | 11/2007 | Homer et al. | 340/572.7 |

FOREIGN PATENT DOCUMENTS

| | | |
|---|---|---|
| EP | 1 343 256 | 9/2003 |
| JP | 2003-304209 | 10/2003 |
| JP | 2007-189272 | 7/2007 |
| JP | 2007189272 A * | 7/2007 |
| KR | 2006119040 A * | 11/2006 |

OTHER PUBLICATIONS

International Preliminary Report on Patentability for corresponding Application No. PCT/IB2008/000937 mailed Jan. 14, 2010.
International Search Report for corresponding Application No. PCT/IB2008/000937 mailed Aug. 4, 2008.

* cited by examiner

*Primary Examiner* — Lewis G West
*Assistant Examiner* — Gennadiy Tsvey
(74) *Attorney, Agent, or Firm* — Renner, Otto, Boisselle & Sklar, LLP

(57) ABSTRACT

An automatic antenna identification system is provided that includes a connector to which a plurality of different antennas tuned to different respective frequencies or frequency bands may be connected. In addition, the system includes circuitry that automatically identifies which antenna of the plurality of different antennas is connected to the connector based on the respective frequency or frequency band of the antenna.

13 Claims, 4 Drawing Sheets

AUTOMATIC ANTENNA IDENTIFICATION AND CONFIGURATION, AND DEVICE INCLUDING THE SAME

TECHNICAL FIELD OF THE INVENTION

The present invention relates generally to devices that utilize antennas for carrying out communications and, more particularly, to a system and device capable of identifying a particular antenna utilized therewith.

DESCRIPTION OF THE RELATED ART

Mobile devices such as mobile phones, media players, personal gaming systems, GPS navigation systems, etc., have become increasingly popular. In fact, many mobile devices nowadays offer a combination of features. For example, a mobile device may function not only as a phone, but also as a media player, game system, GPS locator, etc.

For some functions, the mobile device may utilize an external antenna. In the case of the mobile device serving as an FM radio, oftentimes a headset that connects to the mobile device includes an antenna intended to improve reception. As another example, the same mobile device may serve as a GPS navigation system. In order to improve reception, it may be desirable to connect an external GPS antenna to the mobile device. Similarly, if the mobile device also serves as a mobile television receiver (e.g., under the DVB-H Standard), it is desirable to connect an external mobile television antenna to the mobile device.

The number of pins in a system connector for a mobile device is limited. As the size of mobile devices continues to decrease, there is less space available for a system connector. Accordingly, there is a limit on the number of pins that may fit within the system connector. This has led to system connectors being limited to a single predefined pin to which an antenna is connected, regardless of the type of the antenna. In order to function properly, the mobile device would need to identify the type of antenna that is connected.

One technique for identifying the antenna has been by way of a digital identifier. While functional, the digital identifier requires that a data communication bus be utilized between the mobile device and the antenna. This requires the use of additional pins within the system connector.

In view of the aforementioned shortcomings, there is a strong need in the art for a system and device capable of identifying a particular antenna utilized therewith. In particular, there is a strong need for such a system and device which does not require additional connector pins, etc., particularly in an environment in which the number of pins available in a system connector are limited.

SUMMARY

According to an aspect of the invention, an automatic antenna identification system is provided that includes a connector to which a plurality of different antennas tuned to different respective frequencies or frequency bands may be connected. In addition, the system includes circuitry that automatically identifies which antenna of the plurality of different antennas is connected to the connector based on the respective frequency or frequency band of the antenna.

According to another aspect, the circuitry supplies an RF excitation signal to the antenna that is connected to the connector and detects an extent to which energy from the RF excitation signal is transferred to the antenna, and identifies the antenna that is connected to the connector from among the remaining plurality of different antennas based on such detection.

In accordance with another aspect, the circuitry measures a standing wave ratio of the RF excitation signal provided to the antenna in order to detect the extent to which energy from the RF excitation signal is transferred.

According to yet another aspect, the circuitry comprises a standing wave ratio meter.

According to still another aspect, the circuitry automatically connects the antenna identified as being connected to the connector to a selected input and/or output of an RF circuit from among a plurality of different RF inputs and/or outputs, the circuitry selecting the input and/or output of the RF circuit based on the identification of the antenna.

In accordance with another aspect, the circuitry includes a multiplexer for selectively connecting the plurality of different RF inputs and/or outputs to the antenna connected to the connector based on the identification of the antenna.

According to yet another aspect, the system further includes RF circuitry coupled to the connector and operable at a plurality of predefined frequencies or frequency bands; and a controller that causes the RF circuitry to operate at a selected predefined frequency or frequency band from among the plurality of predefined frequencies or frequency bands based on the identification of the antenna.

According to another aspect, the plurality of predefined frequencies or frequency bands includes at least two of the following standards: CDMA, GSM, IEEE 802.11, GSM, Bluetooth, DVB-H, AM radio and FM radio.

In accordance with another aspect, the circuitry supplies an excitation signal at each of the plurality of different frequencies or frequency bands to the antenna that is connected to the connector, detects an extent to which energy from the excitation signal is transferred to the antenna at each of the plurality of different frequencies or frequency bands, and identifies the antenna that is connected to the connector from among the remaining plurality of different antennas based on such detection.

In yet another aspect, the electronic device is a mobile phone.

According to another aspect, the connector includes a plurality of electrical contacts within a connector housing, wherein at least one of the plurality of electrical contacts serves to couple RF signals to/from the antenna to the electronic device, and at least another one of the plurality of electrical contacts servers to couple an auxiliary device to the electronic device.

In still another aspect, the auxiliary device includes a headset.

According to yet another aspect, the circuitry includes memory having a table stored therein, the table including information identifying each of the different respective frequencies or frequency bands.

According to another aspect, the circuitry supplies an RF excitation signal to the antenna that is connected to the connector at each of the different respective frequencies or frequency bands and detects an extent to which energy from the RF excitation signal is transferred to the antenna, and identifies the antenna that is connected to the connector from among the remaining plurality of different antennas based on the frequencies or frequency bands exhibiting the least reflected energy.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
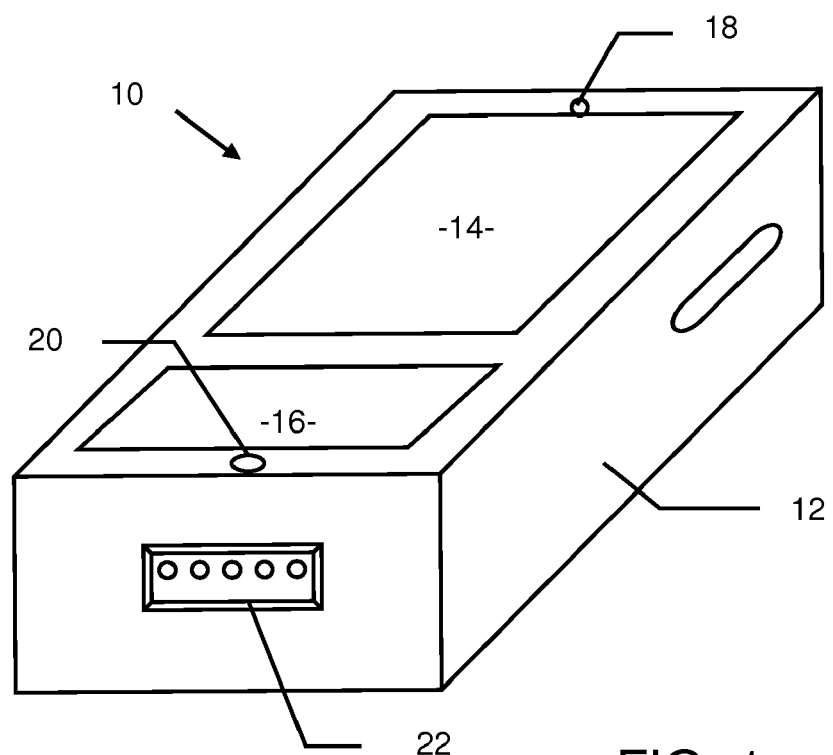
FIG. 1 is a perspective view of a mobile device incorporating a system for identifying an antenna coupled to the device in accordance with an exemplary embodiment of the present invention.

The present invention will now be described with reference to the figures, wherein like reference numerals are used to refer to like elements throughout.

Referring initially to FIG. 1, a mobile device 10 is shown in accordance with an exemplary embodiment of the present invention. The device 10 as described herein is a mobile phone. However, those having ordinary skill in the art will appreciate that the mobile device 10 may be any other type of mobile device such as a portable radio or communicator (e.g., walkie-talkie), wireless telephone handset, personal digital assistant (PDA), media player, GPS navigation system, etc., or any combination thereof.

The mobile phone 10 includes a body 12 which houses the circuitry described herein. In the exemplary embodiment, the body 12 has a "brick" design. It will be appreciated, however, that the body 12 may have any other type of housing without departing from the scope of the invention. For example, the body 12 may have a conventional clamshell or slider configuration.

The mobile phone 10 further includes a display 14 and keypad 16 which serve as a user interface as is known. The user may control various operations of the phone 10 (e.g., place or receive a call), input or access various data stored in the phone 10, surf the internet, etc., as is conventional. In addition, the mobile phone 10 includes a speaker 18 and microphone 20 that enable the user to converse with a party at the other end of a call.

Continuing to refer to FIG. 1, the mobile phone 10 further includes a system connector 22 for connecting the mobile phone 10 to one or more different types of accessories. As is known, a variety of accessories oftentimes may be connected to a mobile phone or other electronic device to provide service operations, data communication, added functionality, improved operation, etc. For example, the system connector 22 can serve as a means for connecting the mobile phone 10 to a recharger for recharging a battery within the phone 10. The system connector 22 also may serve as a means for receiving a data cable for transferring data between the mobile phone 10 and another device (e.g., notebook computer).

Figure 2:
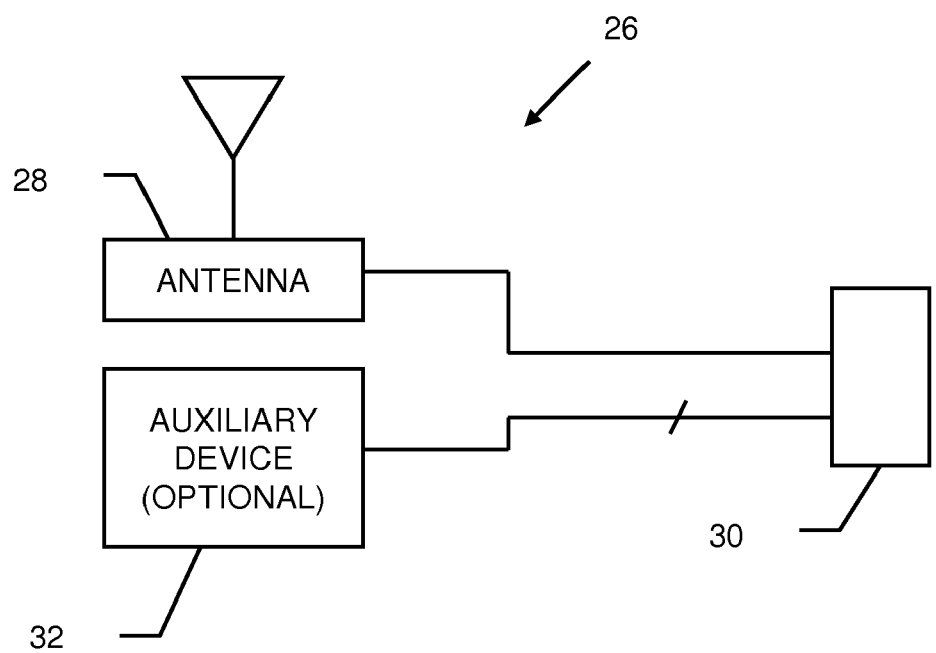
FIG. 2 is a block diagram of an accessory of the type suitable for use with the mobile device of FIG. 1 in accordance with the exemplary embodiment of the present invention.

As mentioned above, oftentimes it can be desirable to utilize the system connector 22 to connect the mobile phone 10 or other electronic device to various accessories each of which include an external antenna for wireless communications. FIG. 2 illustrates schematically any of a variety of such accessories 26. Generally speaking, an accessory 26 includes an external antenna 28 and a connector 30. The connector 30 is designed to mate with the system connector 22 and couple the external antenna 28 to the mobile phone 10. In this manner, the mobile phone 10 can utilize the external antenna 28 in its operation. Additionally, the accessory 26 may include an auxiliary device 32 which also connects to the mobile phone 10 via the connector 30. Thus, in accordance with the present invention, the accessory 26 may be simply an external antenna 28 or may also include an auxiliary device 32, each of which connects to the mobile phone 10 via the connector 30 mating with the system connector 22.

For example, the accessory 26 may simply be an external antenna 28 for improving the reception of the mobile phone 10. Because of the limited size of the mobile phone 10 or other electronic device, the size of any internal antenna is limited which can result in less than optimal reception or connectivity. By using an external antenna 28, the connectivity of the mobile phone 10 or other electronic device can be improved as will be readily appreciated by those having ordinary skill in the art. In one accessory 26, the external antenna 28 may be tuned to the frequency band(s) of the mobile phone network in which the mobile phone 10 is designed to operate (e.g., GSM, CDMA, TDMA, etc.). In another example, the antenna 28 may be tuned to the different frequency band(s) associated with a wireless local area network (WLAN) (e.g., IEEE 802.11 network) in which the mobile phone 10 may operate to access the Internet or the like. According to yet another example, the external antenna 28 may be tuned to the frequency band(s) associated with the reception of mobile media (e.g., digital video broadcast for handhelds, or DVB-H).

According to still another example, the accessory 26 may be a headset for handsfree operation of the mobile phone 10. The auxiliary device 32 in such case can be one or more earbuds, for example. In addition, the antenna 28 may be included in wire(s) connecting the earbud(s) of the headset to the mobile phone 10 via the connector 30 and system connector 22. In such case, the antenna 28 frequently serves as a radio antenna (e.g., FM or AM) for use with a radio receiver included in the mobile phone 10. A user may then enjoy radio broadcasts via the mobile phone 10. According to another example, the accessory 26 may be an external GPS or Bluetooth antenna for use in conjunction with a GPS or Bluetooth receiver included within the mobile phone 10. In such case, the antenna 28 will be tuned to the relevant GPS or Bluetooth frequency band.

Consequently, it will be appreciated that the antenna 28 of an accessory 26 will be tuned to one or more particular frequencies or frequency bands. The particular frequencies or frequency bands for each antenna are determined by the intended use of the antenna 28. For example, an antenna 28 designed for use as an FM antenna will be tuned to one frequency band associated with FM radio, whereas an antenna 28 designed for use as a GPS antenna will be tuned to a different frequency band that is associated with GPS communications. The antenna 28 tuned for use as an FM antenna will exhibit good resonance properties within the FM frequency band but poor resonance properties in the GPS band. Likewise, the antenna 28 tuned for use as a GPS antenna will provide good resonance within the GPS band but poor resonance in the FM band.

As previously noted, the number of pins available in the system connector 22 is becoming more limited. Thus, in the exemplary embodiment the system connector 22 limits the connection between the antenna 28 and the system connector 22 to a single pin, regardless of the type of the antenna (e.g., AM, FM, DVB-H, GPS, GSM, WLAN, etc). The mobile phone 10 therefore would want to identify the type of antenna 28 that is connected to the mobile phone 10 via the system connector 22.

The present invention provides an automatic antenna identification system that enables the mobile phone 10 to identify the particular type of antenna connected to the system connector 22. As will be explained in more detail below in connection with FIGS. 3 and 4, the automatic antenna identification system automatically identifies the antenna based on the respective frequency or frequency band to which the antenna is tuned.

More particularly, the automatic antenna identification system includes circuitry that supplies an RF excitation signal at different frequencies to the antenna 28 that is connected to the system connector 22. In turn, the circuitry detects an extent to which energy from the RF excitation signal is transferred to the antenna 28, and identifies the antenna that is connected to the system connector 22 from among the other antennas based on such detection. For example, the circuitry includes a standing wave ratio (SWR) meter that measures the standing wave ratio of the RF excitation signal provided to the antenna 28. The circuitry may then automatically connect the antenna 28, identified as being connected to the system connector 22, to a selected input and/or output of an RF circuit within the mobile phone 10.

Figure 3:
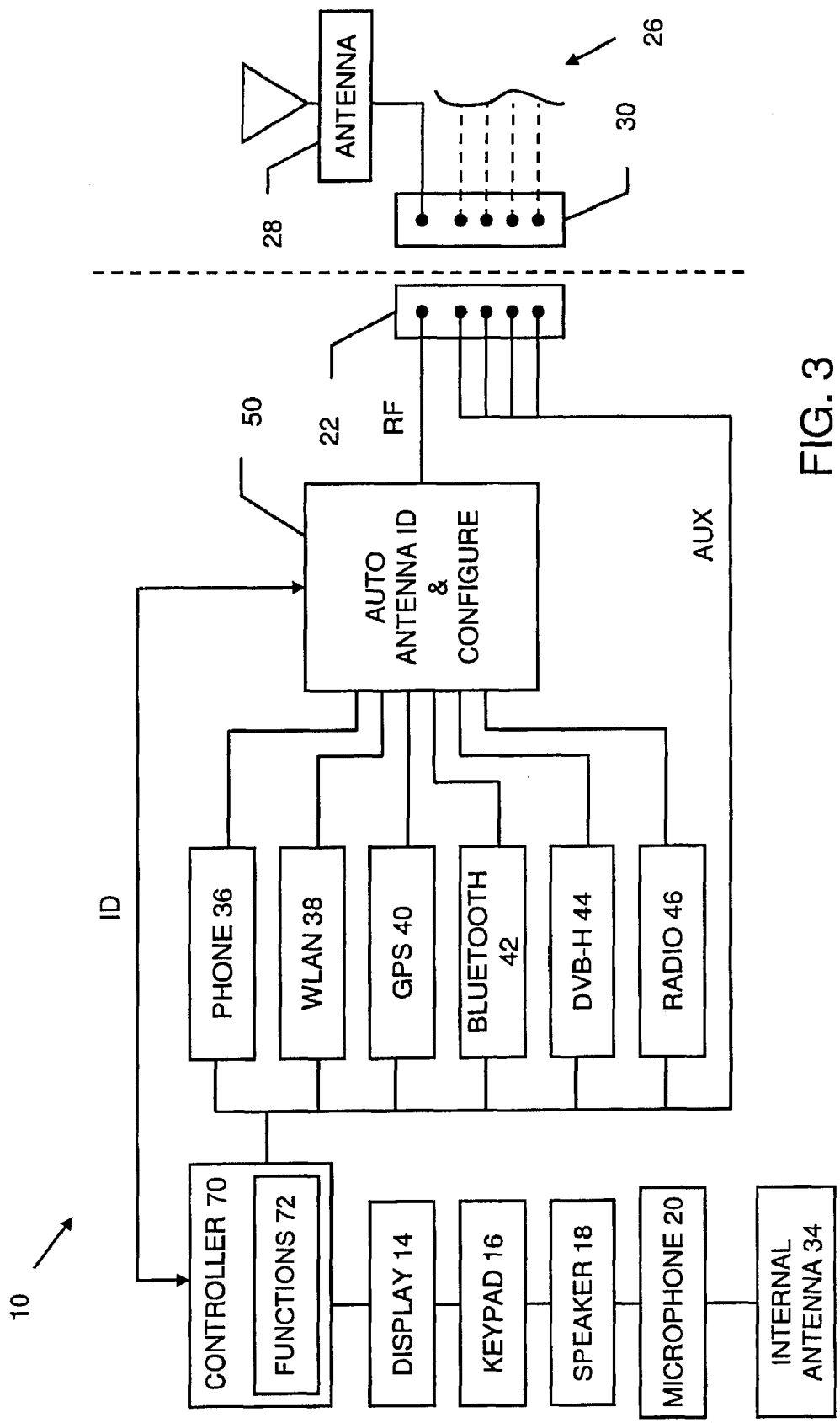
FIG. 3 is a block diagram of the mobile device of FIG. 1 in accordance with the exemplary embodiment of the present invention.

Referring now to FIG. 3, the mobile phone 10 includes a controller 70 configured to control overall operation of the mobile phone 10 in accordance with the operation described herein. The controller 70 is programmed to carry out the various functions 72 associated with the device, be it operation as a mobile phone, media player, web browser, GPS navigation system, etc. The particular functions performed by the mobile phone 10 are not germane to the present invention in its broadest sense.

As previously noted, the mobile phone 10 includes the display 14, keypad 16, speaker 18 and microphone 20. In addition, the mobile phone 10 may include an internal antenna 34 as discussed above.

According to the exemplary embodiment, the mobile phone 10 includes a plurality of different radio frequency (RF) circuits. For example, the mobile phone 10 includes a phone circuit 36, WLAN circuit 38, GPS circuit 40, Bluetooth circuit 42, DVB-H circuit 44 and AM/FM radio circuit 46. Each RF circuit will provide RF operation of the mobile phone 10 at the corresponding frequenc(ies) or frequency band(s). Those having ordinary skill in the art will appreciate that the RF circuits 36,38,40,42,44,46 may be one and the same RF circuit designed to be variable in frequency depending on the particular mode of operation. For ease of description, however, the RF circuits are described herein as being separate and having their own respective RF input and/or output. The respective RF inputs and/or outputs are coupled to an automatic antenna identification and configuration system 50 included in the mobile phone 10.

The system 50 automatically identifies the antenna 28 connected to the system connector 22 as described more fully below in relation to FIGS. 4 and 5. Based on such detection, the system 50 connects the antenna 28 to the appropriate RF input and/or output associated with that particular antenna 28. For example, if the system 50 identifies the antenna 28 connected to the system connector 22 as being an antenna tuned to the FM radio band, the system 50 connects the antenna 28 to the RF input of the radio circuit 46. Similarly, if the system 50 identifies the antenna 28 connected to the system connector 22 as being an antenna tuned to the GPS band, the system 50 automatically connects the antenna 28 to the RF input of the GPS circuit 40.

In one embodiment, the RF circuits 36,38,40,42,44,46 literally represent different RF circuits with different respective RF inputs and/or outputs. In such case, the system 50 may include an antenna multiplexer or the like as discussed below with respect to FIG. 4. By controlling the multiplexer, the system 50 selectively connects the antenna 28 to the RF input and/or output of the corresponding RF circuit. Additionally, the system 50 may be configured to communicate ID information identifying to the controller 70 the particular antenna 28 connected to the system connector 22. This enables the controller 70 to automatically perform any operational or system adjustments appropriate in view of the particular antenna. For example, if the system 50 identifies the antenna 28 as a GPS antenna and the system 50 communicates such information to the controller 70, the controller 70 can automatically configure the phone 10 for GPS operation. In particular, the controller 70 may cause the display 14 to display information to the user regarding operation of the GPS feature of the phone without requiring that the user first navigate through various general menus involving other types of operation (e.g., radio, Bluetooth, DVB-H, etc.).

In another embodiment in which the RF circuits 36,38,40, 42,44,46 are in fact the same RF circuit tunable to operate at different frequencies, the system 50 does not literally need to switch electrically between different respective RF inputs and/or outputs since the same input and/or output will be utilized. Nevertheless, upon identifying the particular antenna 28 connected to the system connector 22 the system 50 can again communicate the identification information to the controller 70. This again enables the controller 70 to configure operation of the phone 10 automatically (e.g., for GPS operation). This may involve providing operation specific displays to the user, adjusting the RF circuit to operate at the operation specific frequenc(ies) or frequency bands, etc.

Although not shown in detail in FIG. 3, data or other information or control can be exchanged between the mobile phone 10 and the auxiliary device 32 (FIG. 2) via the same connectors 22 and 30.

Figure 4:
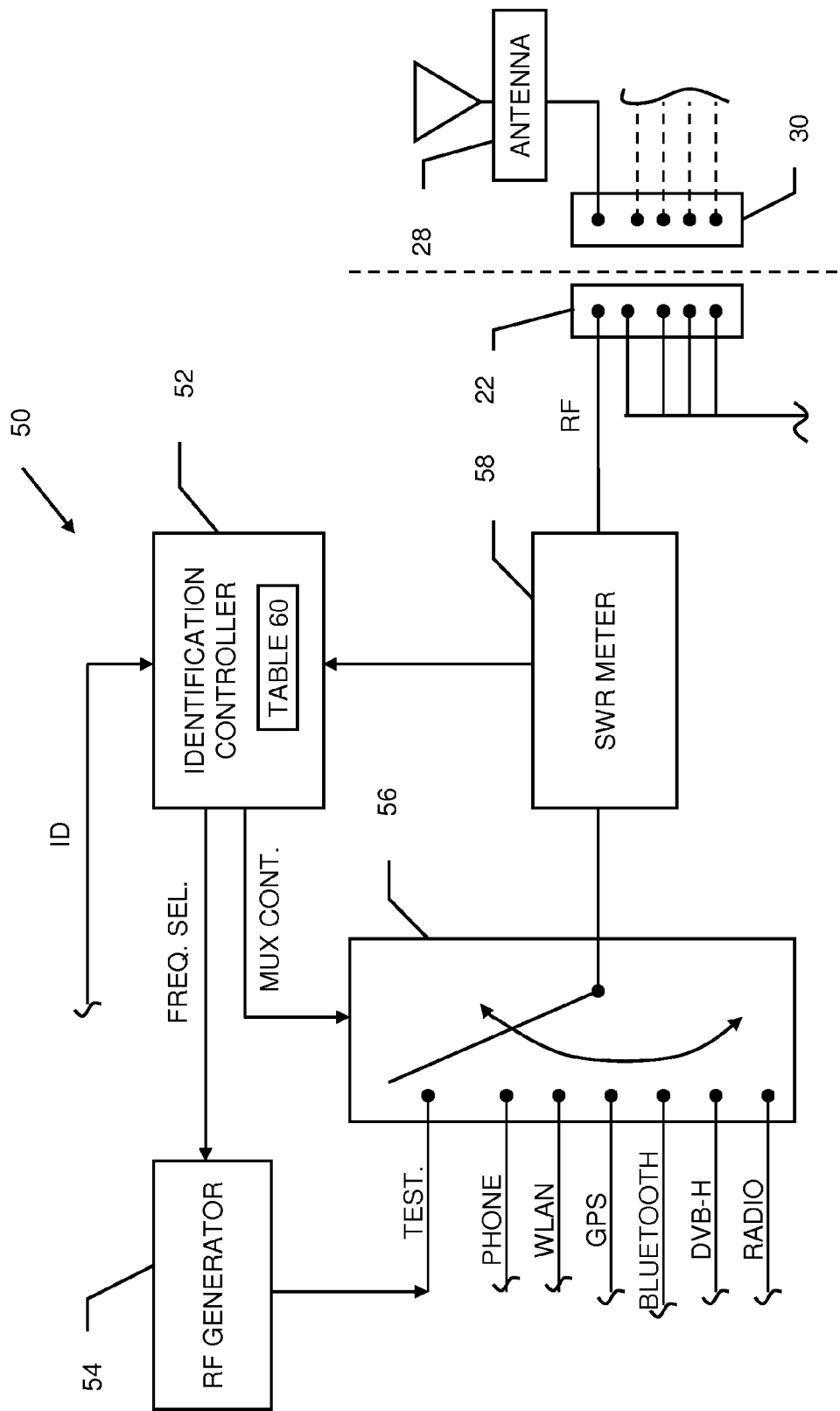
FIG. 4 is a block diagram of an automatic antenna identification and configuration circuit incorporated in the mobile device of FIG. 1 in accordance with the exemplary embodiment of the present invention.
Figure 5:
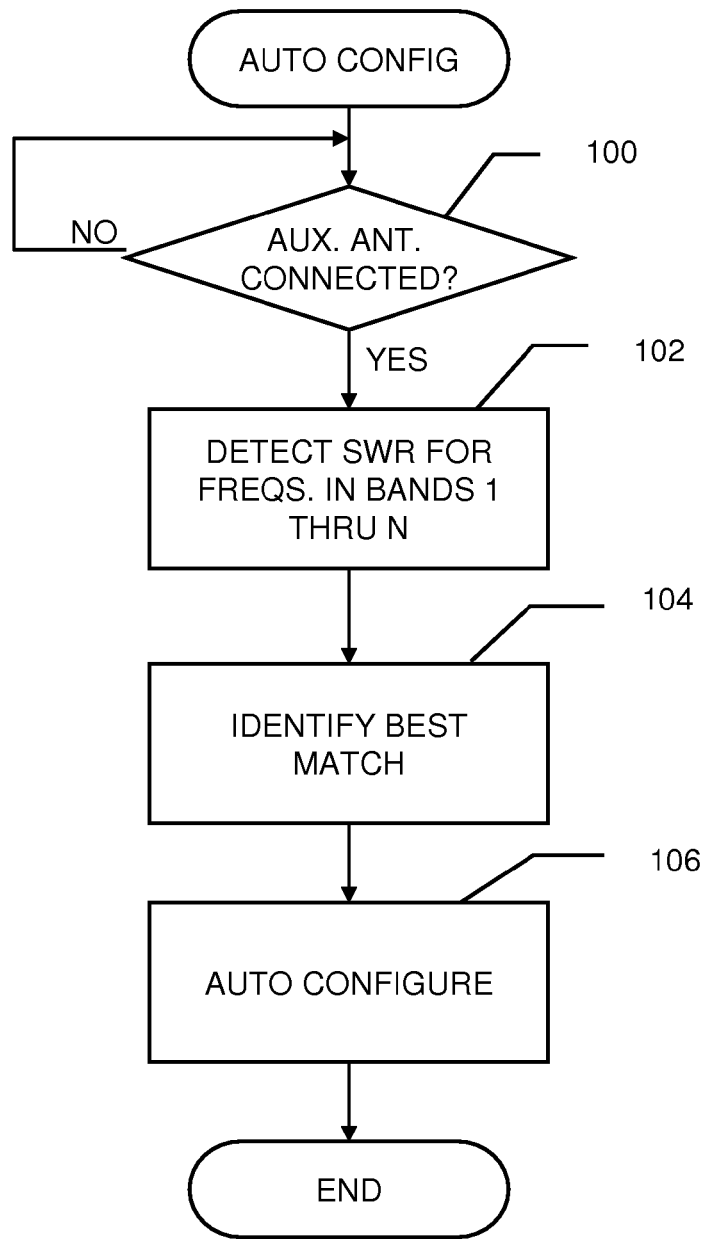
FIG. 5 is a flowchart representing operation of the automatic antenna identification and configuration circuit in accordance with the exemplary embodiment of the present invention.

Turning now to FIG. 4, the system 50 is illustrated in more detail. The system 50 includes an identification controller 52 configured to carry out the various automatic antenna identification and configuration control operations described herein. As will be appreciated, the identification controller 52 may be separate from the controller 70. Alternatively, the identification controller 52 may simply be part of the controller 70 itself without departing from the scope of the invention.

The system 50 further includes an RF generator 54 for generating RF excitation signals that are provided to the particular antenna 28 connected to the system connector 22. The RF generator 54 may be provided separate and apart from the RF outputs of the RF circuits 36,38,40,42,44,46. Alternatively, the RF generator 54 may itself be incorporated within the RF circuits 36,38,40,42,44,46. The RF generator 54 may include multiple generators fixed in frequency, a variable frequency generator, or a combination thereof. For purposes of the present invention, it is simply desirable that a source for RF excitation signals be provided, regardless of whether the source is separate or apart from the other RF circuit(s).

In the exemplary embodiment, the system 50 includes an antenna multiplexer 56 that receives as inputs the respective RF inputs and/or outputs of the RF circuits 36,38,40,42,44, 46. In addition, the multiplexer 56 receives as a test input the output of the RF generator 54. The output of the multiplexer 56 is input to an SWR meter 58 also included in the system 50. As is known, an SWR meter measures the standing wave ratio along a transmission line. By positioning the SWR meter 58 close to the system connector 22, the SWR meter 58 will produce an output indicative of the SWR of the antenna 28 connected to the system connector 22.

Referring again to the identification controller 52, included therein is a table 60 which identifies the particular antennas 28 that are permitted to be utilized with the mobile phone 10 along with the corresponding frequenc(ies) or frequency band(s) at which the antennas 28 will be tuned. For example, the table 60 may appear as follows:

| Antenna | Center Freq. | Band | Measured SWR |
|---|---|---|---|
| Phone | $f_{c1}$ | $f_{l1}$-$f_{u1}$ | |
| WLAN | $f_{c2}$ | $f_{l2}$-$f_{u2}$ | |
| GPS | $f_{c3}$ | $f_{l3}$-$f_{u3}$ | |
| Bluetooth | $f_{c4}$ | $f_{l4}$-$f_{u4}$ | |
| DVB-H | $f_{c5}$ | $f_{l5}$-$f_{u5}$ | |
| RADIO | $f_{c6}$ | $f_{l6}$-$f_{u6}$ | |

For each antenna type (e.g., phone, WLAN, GPS, etc.), the frequency at which the antenna is tuned (e.g., center resonance frequency fc) and the frequency band at which the antenna is tuned (e.g., lower frequency limit fl to higher frequency limit fh) are stored in the table 60.

Operation of the automatic antenna identification and configuration system 50 will now be described in conjunction with the flow chart of FIG. 5. Beginning in step 100, the identification controller 52 determines if an auxiliary antenna 28 has been connected to the system connector 22. This can be done using any of a variety of known techniques. For example, the system connector 22 may include a microswitch that indicates whether another connector has been connected to the system connector 22. Whether an antenna 28 is coupled to the system connector 22 can be determined, for example, by sensing a change in impedance at the pin associated with the antenna within the system connector 22.

Provided it is determined in step 100 that an auxiliary antenna 28 is connected to the system connector 22, the system 50 proceeds to step 102 in which the system 50 measures the SWR of the antenna at the various frequenc(ies) and/or frequency band(s) identified in the table 60. For example, the controller 52 provides a control signal to the multiplexer 56 to cause an excitation signal output from the RF generator 54 to be input to the particular antenna 28 connected to the system connector 22. At the same time, the controller 52 provides a control signal to the RF generator 54 that selects the frequency of the excitation signal output by the RF generator 54. Referring then to the information stored in the table 60, the controller 52 first provides the antenna 28 with an excitation signal having a frequency or frequencies corresponding to the center frequency or band of the first antenna type (e.g., Phone). The controller 52 then records the SWR readings from the SWR meter 58 for each frequency. The controller 52 then causes the RF generator 54 to provide an excitation signal to the antenna 28 at the frequency or frequencies corresponding to the center frequency or band of the second antenna type (e.g., WLAN). Again, the controller 52 then records the SWR readings from the SWR meter 58 for each frequency. This process is then repeated for each of the types of antennas 28 identified in the table 60.

Next, in step 104 the controller 52 identifies the particular antenna 28 connected to the mobile phone 10 via the system connector 22 by virtue of the particular frequency or frequencies at which the antenna 28 displayed the least reflected energy (or the optimum SWR). As will be appreciated, an antenna tuned for a particular frequency or frequency band will tend to resonate at such frequenc(ies) and exhibit the least reflected energy. Thus, the controller 52 in step 104 determines at which excitation frequency or frequencies the antenna 28 exhibited the best SWR. If the frequency or frequencies associated with a GPS antenna exhibit the best SWR, the controller 52 determines that the antenna 48 is a GPS antenna. Similarly, if the controller 52 determines that the excitation frequency or frequencies associated with a DVB-H antenna exhibit the best SWR, the controller 52 determines in step 104 that the antenna 28 is a DVB-H antenna.

In following step 106, the controller 52 initiates auto-configuration as appropriate based on the identification of the antenna 28 connected to the system connector 22. In the case of the antenna multiplexer 56, the controller 52 selectively connects the RF input and/or output of the RF circuit 36,38, 40,42,44,46 corresponding to the identified antenna 28. Thus, for example, if the controller 52 determines that the antenna 28 is a radio antenna based on the measured reflected energy (e.g., SWR), the controller 52 causes the multiplexer 56 to couple the RF input of the radio circuit 46 to the antenna 28. In addition, or in the alternative, the controller 52 provides identification information to the controller 70 to provide for auto-configuration as discussed above.

Accordingly, the present invention provides a system and device capable of identifying a particular antenna utilized therewith. The system and device do not require additional connector pins, etc., which is particularly useful in an environment in which the number of pins available in a system connector are limited.

The term "electronic device" as referred to herein includes portable radio communication equipment. The term "portable radio communication equipment", also referred to herein as a "mobile device", includes all equipment such as mobile phones, pagers, communicators, e.g., electronic organizers, personal digital assistants (PDAs), smartphones or the like.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:
1. An automatic antenna identification system, comprising:
a connector to which a plurality of different antennas tuned to different respective frequencies or frequency bands may be connected; and circuitry that automatically identifies which antenna of the plurality of different antennas is connected to the connector based on the respective frequency or frequency band of the antenna;

a plurality of different RF circuits, each having its own respective output for outputting a signal within a corresponding operation specific frequency or frequency band; and an RF generator for generating excitation signals at predefined frequencies corresponding to the operational frequencies or frequency bands of the plurality of different RF circuits;

the circuit comprising:

a multiplexer having a plurality of inputs coupled to the corresponding outputs of the plurality of RF circuits; and a controller coupled to the multiplexer and causing the multiplexer to selectively couple the output of the RF generator to the antenna to provide the excitation signal based upon which the circuitry determines which antenna from of the plurality of different antennas is connected to the connector;

wherein the multiplexer automatically connects the antenna identified as being connected to the connector to a selected input and/or output of an RF circuit from among the plurality of different RF circuits, the multiplexer selecting the input and/or output of the RF circuit based on the identification of the antenna.

2. The system of claim 1, wherein the circuitry supplies an RF excitation signal to the antenna that is connected to the connector and detects an extent to which energy from the RF excitation signal is transferred to the antenna, and identifies the antenna that is connected to the connector from among the remaining plurality of different antennas based on such detection.

3. The system of claim 2, wherein the circuitry measures a standing wave ratio of the RF excitation signal provided to the antenna in order to detect the extent to which energy from the RF excitation signal is transferred.

4. The system of claim 3, wherein the circuitry comprises a standing wave ratio meter.

5. The electronic device of claim 1, wherein the plurality of predefined frequencies or frequency bands comprise at least two of the following standards: CDMA, GSM, IEEE 802.11, GSM, Bluetooth, DVB-H, AM radio and FM radio.

6. The electronic device of claim 1, wherein the circuitry supplies an excitation signal at each of the plurality of different frequencies or frequency bands to the antenna that is connected to the connector, detects an extent to which energy from the excitation signal is transferred to the antenna at each of the plurality of different frequencies or frequency bands, and identifies the antenna that is connected to the connector from among the remaining plurality of different antennas based on such detection.

7. The electronic device of claim 1, wherein the electronic device is a mobile phone.

8. The electronic device of claim 1, the connector comprising a plurality of electrical contacts within a connector housing, wherein at least one of the plurality of electrical contacts serves to couple RF signals to/from the antenna to the electronic device, and at least another one of the plurality of electrical contacts serves to couple an auxiliary device to the electronic device.

9. The electronic device of claim 8, wherein the auxiliary device is a headset.

10. The system of claim 1, wherein the circuitry comprises memory having a table stored therein, the table including information identifying each of the different respective frequencies or frequency bands.

11. The system of claim 10, wherein the circuitry supplies an RF excitation signal to the antenna that is connected to the connector at each of the different respective frequencies or frequency bands and detects an extent to which energy from the RF excitation signal is transferred to the antenna, and identifies the antenna that is connected to the connector from among the remaining plurality of different antennas based on the frequencies or frequency bands exhibiting the least reflected energy.

12. The system of claim 1, wherein the RF generator is separate and apart from the RF outputs of the plurality of different RF circuits.

13. The system of claim 1, wherein the RF generator is incorporated within the plurality of RF circuits.

* * * * *